(12) United States Patent
Richardson et al.

(10) Patent No.: US 9,328,276 B2
(45) Date of Patent: May 3, 2016

(54) METHOD AND APPARATUS FOR IMPROVING HEAT TRANSFER IN INDUSTRIAL WATER SYSTEMS WITH FERROFLUIDS

(75) Inventors: John Richardson, Hanover, VA (US); Dale P. Stuart, Mechanicsville, VA (US); Everett Carpenter, Mechanicsville, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 166 days.

(21) Appl. No.: 13/100,299

(22) Filed: May 3, 2011

(65) Prior Publication Data

US 2012/0199320 A1   Aug. 9, 2012

Related U.S. Application Data

(60) Provisional application No. 61/330,494, filed on May 3, 2010.

(51) Int. Cl.
| | | |
|---|---|---|
| F25C 1/24 | (2006.01) | |
| C09K 5/10 | (2006.01) | |
| B29C 35/04 | (2006.01) | |
| F28F 13/00 | (2006.01) | |
| B29C 35/00 | (2006.01) | |

(52) U.S. Cl.
CPC ............. *C09K 5/10* (2013.01); *B29C 35/007* (2013.01); *B29C 2035/042* (2013.01); *F28F 2013/001* (2013.01)

(58) Field of Classification Search
CPC .. B29C 2035/042; B29C 35/007; C09K 5/10; C09K 5/00; C09K 5/16; C09K 5/18; F28F 2013/001; F25D 5/00; F25B 9/002; F25C 2301/002

USPC ......... 62/76, 4, 330, 3.1; 165/104.11; 252/67, 252/70, 71

See application file for complete search history.

(56) References Cited

U.S. PATENT DOCUMENTS

| | | | | |
|---|---|---|---|---|
| 3,506,827 | A * | 4/1970 | Alburger | 250/302 |
| 3,667,251 | A * | 6/1972 | Miskolczy et al. | 62/476 |
| 4,078,392 | A * | 3/1978 | Kestner | 62/99 |
| 4,094,804 | A * | 6/1978 | Shimoiizaka | 252/62.52 |
| 4,356,098 | A * | 10/1982 | Chagnon | 252/62.51 R |
| 4,956,113 | A * | 9/1990 | Kanno et al. | 252/62.52 |
| 5,322,756 | A * | 6/1994 | Ziolo | 430/114 |
| 5,641,424 | A * | 6/1997 | Ziolo et al. | 252/67 |
| 6,041,848 | A * | 3/2000 | Langner | 164/491 |
| 8,281,815 | B2 * | 10/2012 | Park et al. | 137/828 |

(Continued)

FOREIGN PATENT DOCUMENTS

CN    101298185   A  *  11/2008   ........... B29C 47/24

*Primary Examiner* — Allana Lewin Bidder
*Assistant Examiner* — Ana Vazquez
(74) *Attorney, Agent, or Firm* — Oliff PLC (57) ABSTRACT

Disclosed are methods and apparatus for improving heat transfer of recirculating fluids within a system by introducing a ferrofluid in which iron oxide nanoparticles are suspended in a carrier fluid that is, in turn, added to a working fluid for increasing the heat capacity of the working fluid. The ferrofluid suspension can be prepared ex-situ and metered into the working fluid from a separate reservoir or may be prepared in-situ as needed through the use of an inline reactor. The ferrofluid can be introduced with other water treatment additives which are compatible with the colloidal suspension and monitored directly and/or indirectly for controlling the heat capacity performance of the system.

24 Claims, 2 Drawing Sheets

(56) References Cited

U.S. PATENT DOCUMENTS

| | | | |
|---|---|---|---|
| 2003/0140638 A1* | 7/2003 | Arshansky et al. | 62/155 |
| 2006/0090474 A1* | 5/2006 | Sauciuc et al. | 62/3.2 |
| 2007/0069426 A1* | 3/2007 | Kurita et al. | 264/428 |
| 2008/0138455 A1* | 6/2008 | Hutchinson et al. | 425/72.1 |
| 2008/0214092 A1* | 9/2008 | Kordonski et al. | 451/36 |
| 2009/0146333 A1* | 6/2009 | Lin et al. | 264/40.6 |
| 2011/0081440 A1* | 4/2011 | Fang et al. | 425/378.1 |
| 2012/0006509 A1* | 1/2012 | McCants et al. | 165/104.11 |

* cited by examiner

METHOD AND APPARATUS FOR IMPROVING HEAT TRANSFER IN INDUSTRIAL WATER SYSTEMS WITH FERROFLUIDS

PRIORITY STATEMENT

This application claims priority from U.S. Provisional Patent Appl. No. 61/330,494, which was filed on May 3, 2010, the entire contents of which are hereby incorporated by reference.

FIELD OF THE INVENTION

This invention is directed to a method of enhancing heat transfer in fluids. In particular, it is a method of increasing heat transfer in fluids by dispersing particles of iron oxides to form a ferrofluid, and monitoring and controlling the dose of the dispersed iron oxide particles using direct measurement techniques. The direct measurement of iron oxide particle concentration permits manual or automated control of the ferrofluid to maintain the enhanced heat transfer properties.

BACKGROUND OF THE INVENTION

Water is the dominant heat transfer fluid used in industrial heating and cooling due to its relatively high heat capacity and latent heat of evaporation. Water has corrosive properties and can be scale forming so water treatment additives, such as corrosion inhibitors, scale inhibitors and micro biocides are typically used in heat transfer fluids. Solutions of a suitable organic chemical (most often ethylene glycol, diethylene glycol, or propylene glycol) are used when the water-based coolant has to withstand temperatures below 0° C., or when its boiling point has to be raised. Water is used in evaporative cooling systems, chilled water closed loops, thermal storage systems, solar collectors, spray water for metal casting are a few examples. Kemmer describes in more detail the variety of industrial heat transfer systems. F. N. Kenner, *The Nalco Water Handbook*, 2nd Ed., McGraw-Hill (1988).

Low thermal conductivity, corrosivity, viscosity, freezing points, boiling points and low heat capacities are the primary limitations in the development of energy-efficient heat transfer fluids required in many industrial applications. To overcome some of these limitations, a new class of heat transfer fluids called nanofluids has been developed by suspending nanocrystalline particles in liquids such as water, oil, or ethylene glycol. Purpose-designed nanoparticles of, e.g., CuO, alumina, titanium dioxide, carbon nanotubes, silica, or metals (e.g., copper, or silver nanorods) dispersed into the carrier liquid the enhances the heat transfer capabilities of the resulting coolant compared to the carrier liquid alone. Wang et al., *J. Chem. Eng.*, vol. 25, no. 4 (2008). The enhancement can be theoretically as high as 350%.

A nanofluid is a fluid containing nanometer-sized particles, called nanoparticles. These fluids are engineered colloidal suspensions of nanoparticles in a base fluid. The nanoparticles used in nanofluids are typically made of metals, oxides, carbides, or carbon nanotubes. Common base fluids include water, ethylene glycol and oil.

Nanofluids have novel properties that make them potentially useful in many applications in heat transfer, including microelectronics, fuel cells, pharmaceutical processes, and hybrid-powered engines as detailed in Das et al.'s, *Nanofluids: Science and Technology*, Wiley-Interscience, p. 397 (2007), engine cooling/vehicle thermal management, domestic refrigerator, chiller, heat exchanger, nuclear reactors, in grinding, in machining, in space, defense and ships, and in boiler flue gas temperature reduction. They exhibit enhanced thermal conductivity and the convective heat transfer coefficient compared to the base fluid.http://en.wikipedia.org/wiki/Nanofluid - cite note-kakac-3 Kakaç et al., *Review of Convective Heat Transfer Enhancement with Nanofluids, Int'l J. of Heat and Mass Transfer*, (Elsevier) 52: 3187-3196 (February 2009); Bi et al., *Application of Nanoparticles in Domestic Refrigerators, Applied Thermal. Eng'g* (2008); and Prasher et al., *Thermal Conductivity of Nanoscale Colloidal Solutions (Nanofluids), Physics Review Letters*, 94, 025901 (2005).

The term nanoparticles is defined to mean a particle having a major dimension of less than 100 nanometers. For a spherical particle, the major dimension is the diameter of the sphere; for particles that are not spherical, the major dimension is the longest dimension. The resulting nanofluids possess extremely high thermal conductivities compared to the liquids without dispersed nanocrystalline particles. For example, 5 vol % of nanocrystalline copper-oxide particles suspended in water results in an improvement in thermal conductivity of almost 60% compared to water without nanoparticles. Choi et al.'s U.S. Pat. No. 6,221,275 ("Choi").

Broad industrial use of nanofluids is limited by the cost and availability of materials, and also the stability of the materials. For example the metallic copper nano particles discussed by Choi require vapor deposition of copper into solution. Some nano particles are manufactured by solid state grinding operations which are energy intensive and time consuming. See, e.g., Kuldip et al.'s, U.S. Pat. No. 5,958,282 ("Kuldip"); and Lu et al.'s, U.S. Pat. No. 7,892,520 ("Lu").

One type of nanofluids are ferrofluids. Ferrofluids are colloidal liquids made of nanoscale ferromagnetic, or ferrimagnetic, particles suspended in a carrier fluid—usually an organic solvent or water. Each tiny particle is thoroughly coated with a surfactant to inhibit clumping. Ferrofluids are composed of nanoscale particles (typically having a diameter of no more than about 10 nm) of magnetite, hematite or some other compound containing iron. This is small enough for thermal agitation to disperse them evenly within a carrier fluid, and for them to contribute to the overall magnetic response of the fluid. The surfactants used to coat the nanoparticles include, but are not limited to oleic acid, tetramethylammonium hydroxide, citric acid, soy lecithin. These surfactants prevent the nanoparticles from clumping together, ensuring that the particles do not form aggregates that become too heavy to be held in suspension by Brownian motion.

A surfactant typically has a polar head and non-polar tail (or vice versa), one of which adsorbs onto a nanoparticle, while the un-adsorbed non-polar tail (or polar head) sticks out into the carrier medium. When a sufficient quantity of the surfactant is present, the surfactant coating on the nanoparticle will form an inverse or regular micelle, respectively, around the particle. Steric repulsion between the similarly encased nanoparticles will then suppress or prevent agglomeration of the particles.

Ferrofluids are commonly used in loudspeakers to remove heat from the voice coil, and to passively damp the movement of the cone as detailed in King's U.S. Pat. No. 4,017,694 ("King"). They reside in what would normally be the air gap around the voice coil, held in place by the speaker's magnet. Because ferrofluids are paramagnetic, they obey Curie's law, and thus become less magnetic at higher temperatures. A strong magnet placed near the voice coil (which produces heat) will attract cold ferrofluid more readily than hot ferrofluid, thereby forcing the heated ferrofluid away from the electric voice coil and toward a heat sink. This is an efficient cooling method which requires no additional energy input.

Ferrofluids containing magnetite can be prepared by combining the appropriate amounts of an Fe(II) salt and an Fe(III) salt in basic solution, a combination that causes the mixed valence oxide, $Fe_3O_4$, to precipitate from solution according to reaction [1]. Ellis et al., *Teaching General Chemistry: A Materials Science Companion*, American Chemical Society (1993); Enzel et al., *Preparation and Properties of an Aqueous-Based Ferrofluid*, *J. Chem. Educ.*, Vol. 76, no. 7, p. 943 (1999); Cabuil, *Magnetic Nanoparticles: Preparation and Properties, Dekker Encyclopedia of NanoScience and Nano-Technology*, ch. 119 (2004).

[1]

$$2FeCl_3 + FeCl_2 + 8NH_3 + 4H_2O \rightarrow Fe_3O_4 + 8NH_4Cl \qquad [1]$$

Researchers have prepared ferrofluids containing small particles of ferromagnetic metals, such as cobalt and iron, as well as magnetic compounds, such as manganese zinc ferrite, $Zn_xMn_{1-x}Fe_2O_4$. (0<x<1; this is a family of solid solutions). But by far, the most work has been conducted on ferrofluids containing small particles of magnetite, $Fe_3O_4$. See, Cabuil.

Despite significant research on nanofluids and ferrofluids, broad industrial application for heat transfer enhancement have remained elusive beyond the domain of electrical devices, small refrigeration units and heat pipes. Expansion of this technology has been limited due to high manufacturing costs, long term stability of the nanofluids, considerations for the environmental impact of nano materials and for the interaction with other water treatment additives.

The following invention discloses a method for cost effective application and control of ferrofluids to a broader class of industrial heat transfer processes than has been previously disclosed. This was accomplished through the preparation of a consistent ferrofluid with particles typically having a size of less than 5 nm diameter and the discovery that this fluid could be added at economical levels to heat transfer fluids and both monitored and controlled to achieve desired improvements in heat transfer efficiency.

DESCRIPTION OF RELATED ART

Ferrofluids are an early form of nanofluid and King's U.S. Pat. No. 4,017,694 discloses a method for the manufacture of loudspeakers having a ferromagnetic fluid contained in the voice coil magnetic air gap and being confined by the loudspeaker magnet field thereby enveloping the portions of the voice coil that are within the magnetic air gap. According to the teachings of King, a critical viscosity range of the ferromagnetic fluid is required, with the viscosity being determined by the viscosity of the liquid phase and the concentration of the colloidal ferromagnetic particles which provide the viscous damping forces on the voice coil effective at low and high frequencies. The damping forces are due to shearing stress set up in the fluid by motion of the voice coil in response to electrical excitation and result in surprisingly improved acoustical performance, higher electrical output and freedom from hiss in the loudspeaker. The ferromagnetic fluid also provides an improved heat sink for the voice coil thus improving the electrical power dissipation capability of the voice coil. An opening in the cap over the voice coil permits entrapped air under the cap or dust cover to escape thereby eliminating a noticeable hiss.

There is significant prior art on the preparation of ferrofluids. Magnetite particles can be produced by chemical precipitation processes. Generally, in such processes, magnetite particles are produced by mixing ferrous and ferric salt solutions in the presence of an alkaline medium. The resultant particles are then coated with surfactant. Both water-based and oil-based ferrofluids can be produced by means of this technique. For example, U.S. Pat. No. 5,240,626 discloses the synthesis of a water-based ferrofluid in which nanosized magnetite particles are coated with a single carboxyl-functional polymer surfactant. Two separate surfactant coatings are used for magnetite particles in aqueous phase in U.S. Pat. No. 4,094,804. Lignosulphonate, a byproduct of wood pulping, was used to prepare an inexpensive water-based colloid by chemically precipitating magnetite microcrystals as disclosed in U.S. Pat. No. 4,110,208.

More recently Lu et al.'s U.S. Pat. No. 7,892,520 discloses a method for preparing an aqueous dispersion of $\gamma$-$Fe_2O_3$ nanoparticles. The method includes grinding an iron (II) hydrated salt, an iron (III) hydrated salt, an inorganic salt, and alkali hydroxide in a grinding or milling machine.

Thakur et al.'s U.S. Pat. No. 5,240,626 describes an aqueous ferrofluid comprises a plurality of colloidally-dispersed magnetite particles and a dispersing aid. The magnetite particles are coated with an anti-agglomeration agent which is a carboxy-functional polymer.

Borduz et al.'s U.S. Pat. No. 6,277,298 discloses a composition and process for producing a chemically stable magnetic fluid comprising a plurality of magnetic particles covered first with a small molecular weight surface modifier, which is a nondispersant and acts as a surfactant-accepting layer, and then with at least one surfactant. The surface modifier/surfactant coated magnetic particles are then suspended in a silicone oil-based, hydrocarbon oil-based or an ester oil-based carrier liquid. Raj et al.'s U.S. Pat. No. 5,958,282 discloses a low cost ferrofluid manufacturing process which applies energy to a nonmagnetic $\alpha$-$Fe_2O_3$ starting material to render it magnetic and suitable for use in a ferrofluid. The material is placed, together with a solvent and a surfactant, in a commercial attrition mill where the mill action converts the non-magnetic particles to magnetic particles.

Segal's U.S. Pat. No. 5,863,455 describes colloidal fluids having improved insulating and/or cooling properties. Embodiments of the invention involve colloidal fluids which comprise a carrier liquid and a dispersed phase of non-metallic particles, wherein the colloidal fluid has a saturation magnetization of less than about 50 Gauss. The compositions may be employed to insulate and/or cool electromagnetic devices, including high power devices, such as power transformers.

Additional work is reflected in Choi et al.'s U.S. Pat. No. 6,221,275 which discloses a method of and apparatus for enhancing heat transfer in fluids such as deionized water. ethylene glycol, or oil by dispersing nanocrystalline particles of substances such as copper, copper oxide, aluminum oxide, or the like in the fluids. Nanocrystalline particles are produced and dispersed in the fluid by heating the substance to be dispersed in a vacuum while passing a thin film of the fluid near the heated substance. The fluid is cooled to control its vapor pressure. The impact of the nano particles was attributed to the improvement in thermal conductivity imparted by the nano particles.

More recently, Haping et al.'s U.S. Pat. No. 7,871,533 describes a nanofluid, which comprises a thermal transfer fluid and carbon nanoparticles. The nanofluid may be hydrophilic nanofluids, such as a coolant, or hydrophobic nanofluids, such as nanolubricants or nanogreases. In particular, the present invention provides a homogenous hydrophilic nanofluid, which contains soluble carbon nanotubes in the hydrophilic thermal transfer fluid. The present invention also provides a nanogrease, which is a sustainable dispersion of solid carbon nanotubes in a hydrophobic thermal transfer fluid. The solid carbon nanotubes function as both as a thickener to modulate viscosity and as a solid heat transfer medium to enhance thermal conductivity and high temperature resistance.

Yatskov's U.S. Pat. No. 7,304,842 describes apparatus and methods for cooling processors and other electronic components in computers and other systems are disclosed herein. A heat sink configured in accordance with one embodiment of the invention includes a heat pipe structure. The heat pipe structure includes an interface portion offset from a body portion by a leg portion. The interface portion is configured to be positioned proximate to a processor or other electronic device, and the body portion is configured to be spaced apart from the electronic device. The heat pipe structure further includes a working fluid. The working fluid is positioned to absorb heat from the electronic device at the interface portion of the heat pipe structure and transfer the heat to the body portion of the heat pipe structure. In one embodiment, the heat sink can further include a plurality of cooling fins attached to the body portion of the heat pipe structure.

Rao et al.'s, *An Investigation of the Effect of Nanoparticles on the Effectiveness of a Heat Exchanger*, Proceeding of ASME IPACK 2007, Paper No. IPACK2007-33768 (2007), discuss that convective heat transfer can be improved by enhancing the thermal conductivity of the fluid. It has been established that fluids containing suspended solid particles of metallic origin in nanoscale dimensions, display enhanced thermal performance. An experimental double pipe heat exchanger with the hot fluid flowing through the inner tube was used in the study. Aluminum oxide and copper oxide nanoparticles with a size range of 20 to 30 nm suspended in water using ultrasonic agitation was used as the hot fluid, and water was used as the cold fluid passing through the annulus. The concentration of the suspended nanoparticles was varied to investigate its effect on the performance of the exchanger. The operating temperature is also used as a parameter in the study. Typically, an enhancement of 4.5 to 7 percent was observed in the effectiveness of the heat exchanger for 0.26% weight fraction of the nanoparticles in suspension, in an operating temperature range of 50-70° C. The effectiveness of the heat exchanger was found to increase with the concentration of nanoparticles for both materials used.

Soomers et al.'s, *Experimental Investigation into the Convective Heat Transfer System-Level Effects of $Al_2O_3$-Propanol Nanofluids*, J. Nanoparticle Research, DOI 10.1007/211051-009-9657-3 (2009), measured the effect of aluminum oxide nanoparticles in dilute suspensions and observed changes in specific heat and thermal conductivity. They observed a small but significant enhancement in heat transfer performance across a heat exchanger at 1 wt % concentration. They concluded however that using nanoparticles to enhance heat transfer performance could not be justified for small changes in heat transfer efficiency they observed. They also noted some particle instability and abrasion occurring in the loop due to the concentration of aluminum oxide nano particles.

Vasu et al.'s *Application of Nano Fluids in Thermal design of Compact Heat Exchanger*, Int'l J. of NanoTechnology and Applications, vol. 2, no. 1, pp. 75-87 (2008), discussed the application of aluminum oxide nanofluids to thermal design of a compact heat exchanger. Vasu found increased cooling capacity with the introduction of the particles at relatively high volume fractions >1%, which is practical for small systems but would be economically unattractive for large heat transfer systems which have water losses. These authors also did not discuss the abrasive nature of aluminum oxide as discussed by Sommers.

The prior art reveals several manufacturing processes for ferrofluids and the benefits of nano materials as additives or components of heat transfer media. The prior art does not reveal how to utilize the benefits of nano materials and ferrofluids in large scale industrial heat transfer systems such as evaporative cooling systems, solar power systems, thermal storage systems, spray cooling water, chilled water or glycol based closed loops. The prior art does not reveal if these ferrofluids can be economically introduced and controlled to achieve cost beneficial improvements in heat transfer efficiency with minimal impact on the environment and minimal interaction with other water treatment additives.

Other references relevant to the foregoing discussion of ferrofluids include, for example, Masuda et al., *Alteration of Thermal Conductivity and Viscosity of Liquid by Dispersing Ultra-Fine Particles (Dispersion of $Al_2O_3$, $SiO_2$, and $TiO_2$ Ultra-Fine Particles)*, Netsu Bussei 7 (4) pp. 227-233 (1993); Keblinski et al.'s *Mechanisms of heat flow in suspensions of nano-sized particles (nanofluids)*, Eastman Int'l J. of Heat and Mass Transfer, vol. 45, pp. 855-863 (2002); Palm et al.'s *Heat Transfer Enhancement with the use of Nanofluids in Radial Flow Cooling Systems Considering Temperature-Dependent Properties*, Appl. Therm. Eng., 26:2209 (2006); Withers et al.'s U.S. Pat. No. 6,695,974; Krishnamurthy et al.'s *Enhanced Transport in Nanofluids*, Nano Lett., 6:3 pp. 419-23 (2006); Mirmasoumi et al.'s *Numerical Study of Laminar Mixed Convection of a Nanofluid in a Horizontal Tube using Two-Phase Mixture Model*, Appl. Therm. Eng., 28:7 pp.717-27 (2008); Ge et al.'s *AuPb Metal Nanoparticles as Probes of Nanoscale Thermal Transport in Aqueous Solution*, J. Phys. Chem. B., 108:18870 (2004); Russel et al.'s *Colloidal Dispersions*, Cambridge University Press (1989); Tronc et al.'s *Transformation of Ferric Hydroxide into Spinel by Fell Absorption*, Langmuir 8, pp. 313-19 (1992); and Rlums' *New Applications of Heat and Mass Transfer Processes in Temperature Sensitive Magnetic Fluids*, Brazilian J. of Physics, 25:2 p. 112 (1995). Each of the references cited or discussed in this disclosure is hereby incorporated by reference, in its entirety and for any purpose.

BRIEF SUMMARY OF THE DISCLOSURE

This invention comprises a method for improving heat transfer of recirculation fluids comprising a ferrofluid consisting of a stable suspension of iron oxide particles less than 100 nm in diameter suspended in a carrier fluid. The colloidal suspension can be prepared ex-situ or in-situ through the use of an in line reactor which affords a cost effective method for manufacturing said ferrofluid. The ferrofluid can be introduced with other water treatment additives which are compatible with the colloidal suspension. The ferrofluid is introduced into the heat transfer fluid at a predetermined concentration and the concentration of iron oxide particles are monitored and controlled through the use of in-line and grab sample detection methods. The ferrofluid is added to the heat transfer system to achieve gains in heat transfer efficiency.

DESCRIPTION OF THE DRAWINGS

Example embodiments of apparatus that could be used for practicing the invention are described more fully below with reference to the attached drawings in which.

It should be noted that these figures are intended to illustrate the general characteristics of methods and apparatus with reference to certain example embodiments of the invention and thereby supplement the detailed written description provided below. These drawings are not, however, to scale and may not precisely reflect the characteristics of any given embodiment, and should not be interpreted as defining or limiting the range of values or properties of embodiments within the scope of this invention. In particular, the relative sizing and positioning of particular elements and structures may be reduced or exaggerated for clarity. Similarly, structures that would well known to those of ordinary skill in the art including, for example, piping, pumps, heat exchangers, valves, meters and communication and control lines have been omitted for clarity but would, obviously, be necessary for implementing such an apparatus and method.

DETAILED DESCRIPTION OF THE INVENTION

The present invention comprises the introduction of a ferrofluid to a recirculating or once through heat transfer system at a concentration range of ferrofluid from 0.001% to 1.0% as iron. Preferably the concentration of ferrofluid is in the range 0.001-0.1% as iron in solution. The ferrofluid is introduced as a pre-prepared solution or can be manufactured in situ from a two stream reaction. Common laboratory methods are documented for the production of aqueous solutions of ferrofluids to produce iron oxide particles in the range <100 nm, preferably in the range <30 nm and most preferably in the range <10 nm. The ferrofluid is introduced into the heat transfer fluid along with other water treatment additives such as corrosion and scale inhibitors. Corrosion and scale inhibitors are selected to be compatible with the ferrofluid. The ferrofluid is metered into the heat transfer system using chemical dosing equipment. The ferrofluid is added to the system to achieve a desired concentration as confirmed by direct measurement of the ferrofluid concentration through one of the following methods, UV-Vis Spectroscopy, iron measurements, fluorescence, radio frequency measurements, Hall effect measurement, particle size measurement. Measurement devices can be placed in an on-line mode for direct feedback to chemical dosing equipment.

Proposed Applications

This invention is useful in heat transfer applications where high volumes of water or high energy use are required to provide sufficient heat transfer. One such application is metal casting for either aluminum or steel. Water-cooling plays a major role in extracting heat from both the mold and solidifying metal during the continuous casting of steel and aluminum alloys. Heat extraction rates during water-cooling, which have strong dependence on the metal surface temperature, can change rapidly with time as the strand cools down. Consequently, uncontrolled cooling may cause fluctuations in the temperature gradients inside the solidifying shell and generate tensile thermal stresses at the solidification front that can ultimately lead to the appearance of hot tears/cracks in the final product.

The application of ferrofluids to casting cooling systems provides for more efficient heat transfer through higher heat capacity, higher thermal conductivity and enhanced surface area that promotes more uniform boiling at the wetted surfaces of the molds. All of these factors can lead both to improved energy and improved water use as well as the ability to reduce fluctuations in the casting process thus reducing the tensile and thermal stresses in the steel.

Figure 1:
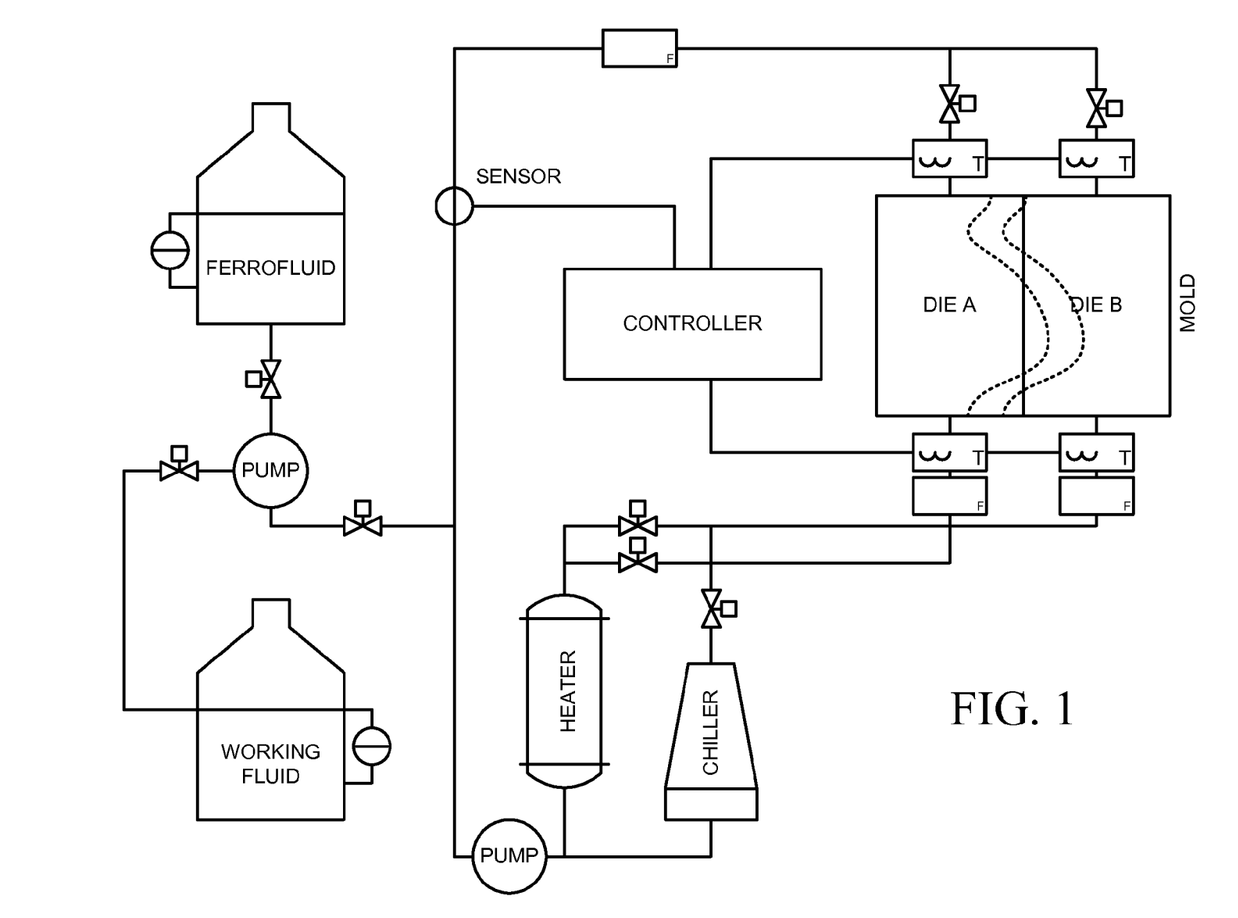
FIG. 1 illustrates a first example embodiment of an apparatus that can be used to practice the method of controlling mold heating and/or cooling profiles as detailed below in which a ferrofluid is introduced into a circulating heating/cooling system for modifying the system performance and capabilities.

As illustrated in FIG. 1, a reservoir of ferrofluid may be provided in communication with a circulating fluid system utilized for controlling or modulating the heating and/or cooling profile of a mold assembly comprising at least two die elements that cooperate to form a recess for receiving the casting material, typically a metal, metal alloy or polymer. The ferrofluid is introduced, along with a quantity of a working fluid, into the system. The enhanced working fluid is then circulated as needed through channels provided in the die for controlling the temperature, heating profile and/or cooling profile of the mold. Temperature, pressure and flow sensors may be utilized throughout the system for monitoring the system performance against target parameters. A controller utilizes the various parametric inputs to control the system performance against a target temperature and/or temperature profile. One or more additional sensors may be provided for monitoring the quantify of the ferrofluid or other tracer component(s) within the working fluid. The input from these sensors may, in turn, be utilized by the controller for adjusting the heat capacity, ferrofluid concentration or other additive packages over a period of time in order to provide more consistent performance.

Figure 2:
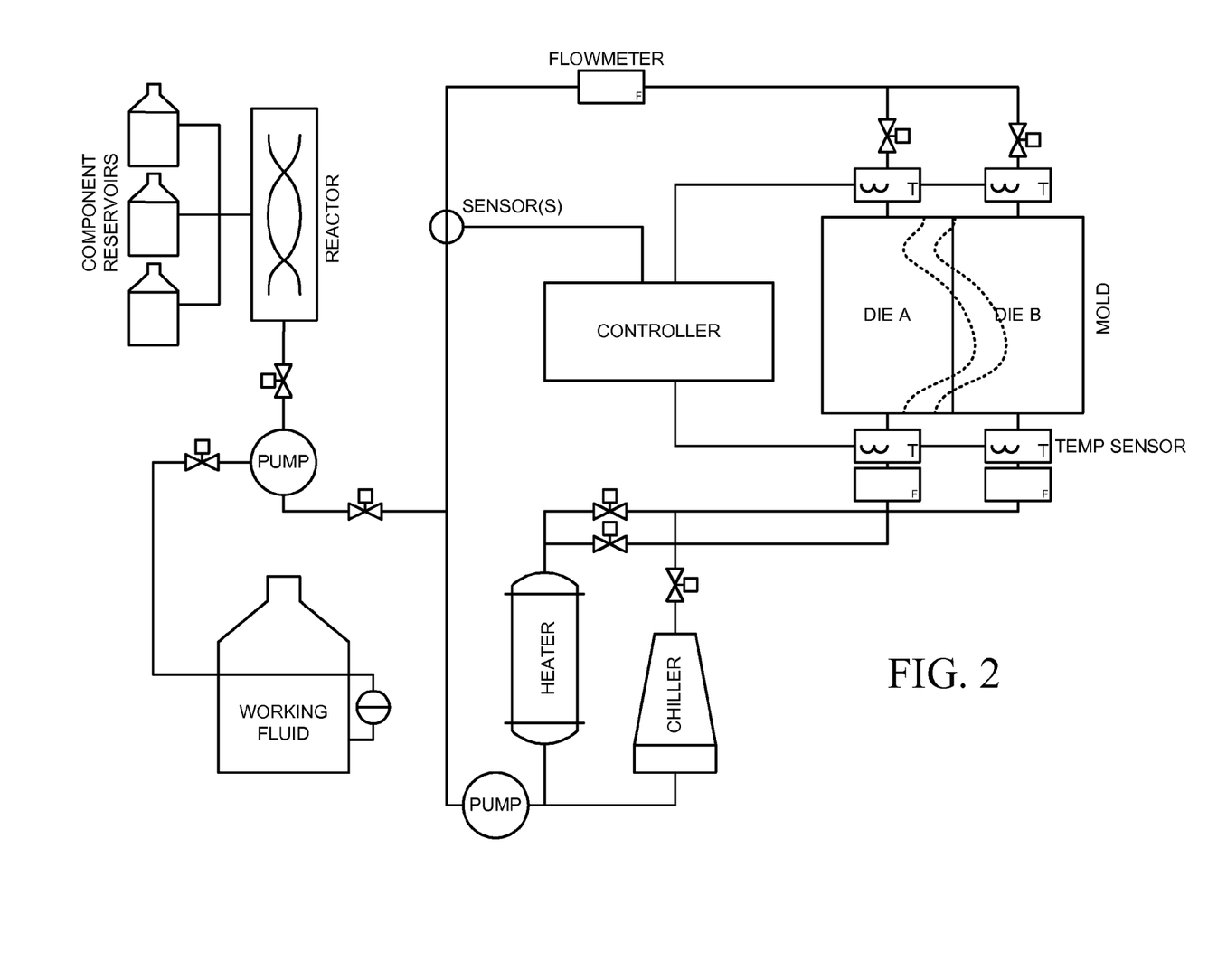
FIG. 2 illustrates a second example embodiment of an apparatus that can be used to practice the method of controlling mold heating and/or cooling profiles as detailed below in which a ferrofluid is manufactured as needed and is then introduced into a circulating heating/cooling system for modifying the system performance and capabilities.

As illustrated in FIG. 2, the reservoir of FIG. 1 may be replaced by one or more reactors that can generate one or more ferrofluids as needed, thereby reducing the need for ferrofluid storage and improving the control over the ferrofluid particle morphology and composition, thereby providing another means for controlling the system performance. As will be appreciated by those skilled in the art, the apparatus illustrated in FIGS. 1 and 2 may be modified significantly to adapt it for a wide variety of specific applications without departing from the basic teachings provided thereby. Similarly, the reactor(s) may be configured for operation in continuous flow or batch processing depending on the demands of the system and the capabilities of the associated control and process equipment.

Another application of the present invention is in the application of the ferrofluid to solar collector fluids which will gain from the enhanced heat capacity and thermal conductivity imparted by the ferrofluid.

Other applications include use in open and closed aqueous and non-aqueous heat transfer systems, such as evaporative cooling, thermal storage systems, chilled water loops, automotive coolant systems. In these cases the enhanced thermal properties can improve operating efficiency, permit the use of other heat transfer fluids beyond the design specification of the equipment.

EXAMPLES

The example ferrofluid used in the following comparative trials was prepared using the following procedure to yield particle in the range <10 nm.

Dissolve 2 g of citric acid in 100 ml of 25% w/w TMAOH (aq) to make ~2% w/vol solution of citric acid.

Prepare 8 ml of 0.5 M iron (III) sulfate and 2 ml of 2.0 M iron (II) sulfate (sulfuric acid can be used to aid in solubility of the iron).

While vigorously stirring the citric acid solution, quickly add the 10 ml of iron solutions to the citric acid solution to form a reaction mixture.

Stir the reaction mixture for an additional 15 minutes.

Add 100 ml of deionized (DI) water to reaction mixture.

Heat Capacity Measurements

A differential scanning calorimeter (DSC) was used to collect heat capacity data, specifically, a DSC model Q200 from TA instruments with modulation. A Tzero press with hermetically sealed pans was used to hold and enclose the ferrofluid sample during testing. The calorimeter operated in heat only modulation mode was then used to produce the following heat capacity measurements as a function of temperature and ferrofluid concentration (mg/L)

TABLE 1

Heat Capacity of Water Treated with Ferrofluid

| Heat Capacity | Ferrofluid Concentration (mg/L) | | | | |
|---|---|---|---|---|---|
| $(J/g \cdot °C.)$ | 0 | 44 | 238 | 432 | 1142 |
| Temperature °C. 47 | 4.40 | 5.40 | 6.20 | 5.60 | 5.90 |
| 57 | 4.52 | 5.50 | 6.25 | 5.70 | 6.00 |
| 67 | 4.52 | 5.50 | 6.25 | 5.70 | 6.00 |
| 77 | 4.52 | 5.50 | 6.25 | 5.70 | 5.80 |
| 87 | 4.52 | 5.50 | 6.30 | 5.60 | 5.40 |

It can be seen from TABLE 1 that the introduction of ferrofluid increases the heat capacity of water up to 40% with a maximum impact observed at a concentration of approximately 200 mg/L of ferrofluid. It is also observed that concentrations of ferrofluid <0.1% are effective to increasing the specific heat capacity of water, optimally concentration <0.05% are preferred.

The ferrofluid can be detected both in-line and by grab sample analysis using standard optical techniques such as UV-vis absorption spectroscopy, since it imparts a color to the recirculating solution proportional to concentration according to Beer's Law (also known as the Beer-Lambert Law). Absorbance measurements are made in the range 250-500 nm. The ferrofluid can also be functionalized to be measured directly by fluorescence spectroscopy through the incorporation of fluorescent dyes during manufacture, such as uranine, eosin, pyrene tetra sulfonic acid, naphthalene sulfonic acid. These dyes incorporate on the surface of the iron oxide and are bound to the surface in the same manner as other surfactants used to stabilize the particle. The concentration of iron can also be determined by conventional means such as colorimetric analysis, atomic absorption or inductively coupled plasma spectroscopy.

The ferrofluid has magnetic properties that permit it to be measured using magnetic detectors, induced current detectors, radio frequency detectors. These offer advantages that they are reagentless and can be used in an on-line mode with flow. Particle size detectors can also be used to detect and quantify the ferrofluid typically using light scattering techniques.

Cooling Tower Efficiency Testing

Heat transported through a system is be calculated from Equation [1]

$$Q = \rho F C_p \Delta T \quad [1]$$

where $\rho$ is the density of the heat transfer fluid, F is the flow rate, $C_p$ is the heat capacity, and $\Delta T$ is the change in heat between the heat inlet and outlet of the heat exchanger. Because this equation describes heat, Q, in motion the units for heat are in joules/sec or watts. When monitoring an open system such as a cooling tower, a calculation is done considering the limit of cooling or wet bulb temperature. The cooling tower efficiency (E) can then be determined using Equation [2]:

$$E = (T_o - T_i)/(T_i - T_{wb}) \quad [2]$$

where $T_i$ is the temperature of the inlet of the heat exchanger, $T_o$ is the temperature of the outlet of the heat exchanger and $T_{wb}$ is the wet bulb temperature.

A pilot cooling system was used to test the impact of ferrofluid concentrations and recirculation rate on cooling tower efficiency. The cooling towers are recirculating water systems, constructed with four 1,500 watt heating rods. Evaporative cooling is achieved through water being sprayed onto clear PVC louvers encased with clear solid PVC sheets (so the louvers are in a tunnel) where the water drips into the basin. The water is kept at a constant level by a level sensor and water feed system. An exhaust fan is on top of the louver tunnel. The total system volume is 12.5 gallons. The flow rates on the cooling tower range from 2.5 gallons per minute up to 9 gallons per minute.

TABLE 2 shows cooling tower efficiency measurements of water treated with Ferrofluid as a function of flow rate and concentration. Results show that small addition of ferrofluid <100 mg/L can achieve approximately 10% improvement in cooling tower efficiency when compared to an untreated system.

TABLE 2

Evaporative Cooling Tower Efficiency as a Function of Ferrofluid Concentration and Flow Rate

| Cooling Tower | | Ferrofluid Concentration (mg/L) | | |
|---|---|---|---|---|
| Efficiency % | | 0 | 61 | 1000 |
| Flow rate L/Min | 12 | 72 | 78 | 76 |
| | 15 | 46 | 55 | 53 |
| | 19 | 45 | 46 | — |
| | 23 | 32 | 39 | — |

Closed Loop Efficiency Testing

A closed loop system was constructed of PVC piping with a 48 gallon basin. The fluid is circulated with a Price pump (HP7550NR) connected to a 1.0 H.P. Magnetek motor that rotating at 3,500 rpm. The flow rate is controlled by a post pump valve with the flow rate verified by a gallon per minute sight gauge from Dweyer. The basin was cooled with a FTS System chiller (LFC20C01). Two 1500 watt heating rods are inserted into the piping. The water was kept at a constant level by a level sensor and water feed system in the basin. The total system volume is 48 gallons. This system was then used for testing heat transfer at flow rates between 2.5 gallons per minute and 9 gallons per minute.

The heater rods are electrical resistance heaters surrounded by a pipe to form an annular flow channel through which the working fluid will be passed as it is heated by the heater rods. For the purpose of these experiments, the inside diameter of the pipe surrounding the heating rod was 2.5 cm. A cylindrical stainless steel coupon having an outside diameter of 2.0 cm was placed over each the heating rod, thereby forming an annular region with a 0.25 cm space through which the water or other working fluid could pass. With heating rods having a length of 24.0 cm, each heating rod assembly provided about 0.06 $m^2$ of heating area with each heating rod capable of providing a substantially constant heat flux on the order of 25,000 $W/m^2$.

A chiller refrigeration ton is defined as: 1 refrigeration ton=12,000 Btu/h=3,025.9 k Calories/h and is the amount of heat removed by an air conditioning system that would melt 1 ton of ice in 24 hours. A cooling tower ton is defined as: 1 cooling tower ton=15,000 Btu/h=3,782 k Calories/h. A water system's heat load in Btu/h can be simplified to the relationship illustrated in equation [3]:

$$h = c_p\, \rho\, q\, dt = (1\ \text{Btu}/1\ \text{lbm}\ ^\circ\text{F.})(8.33\ \text{lbm/gal}) q (60\ \text{min/h}) dt = 500\, q\, dt \qquad [3]$$

where h=heat load (Btu/h), cp=1 (Btu/1 bm ° F.) for water, ρ=8.33 (lbm/gal) for water, q=water volume flow rate (gal/min) and dt=temperature difference (° F.).

TABLE 3 shows the impact of the ferrofluid on cooling load in a chilled closed loop as a function of flow rate and ferrofluid concentration.

TABLE 3

Cooling Load Improvement of Closed Loop Cooling System with Ferrofluid Concentration and Flow Rate

| Gain In Cooling Load % | | Ferrofluid (mg/L) | |
|---|---|---|---|
| | | 563 | 1126 |
| Flow Rate (gpm) | 3.0 | 2 | 6 |
| | 5.0 | 15 | — |
| | 7.0 | 8 | — |
| | 9 | 11 | 20 |

Results in TABLE 3 show the percent increase in cooling load as a function of flow rate and ferrofluid concentration. It can be seen that effective cooling load increases from 2 to 20% depending on the concentration of ferrofluid within the working fluid and the system flow rate. The substantial increases in cooling load represents the ability of the ferrofluid to increase the effective tonnage of a cooling load, thus allowing for greater cooling capacity and reduced energy consumption from existing equipment.

TABLE 4

Effective Cooling Load in Closed Loop as Function of Ferrofluid and Flow Rate

| Cooling Load (BTU/hr) | | Ferrofluid (mg/L) | | |
|---|---|---|---|---|
| | | 0 | 563 | 1126 |
| Flow Rate (gpm) | 2 | 8000 | 6700 | 8000 |
| | 2.5 | 8000 | 8600 | 9000 |
| | 3 | 8300 | 7000 | 8700 |
| | 3.5 | 7500 | — | 7000 |
| | 4 | 7400 | 6500 | 7400 |
| | 5 | 7500 | — | 7500 |

In this series of experiments cooling load of a closed loop system was calculated as a function of ferrofluid concentration and flow rate. In general, the effective cooling load increased with increasing ferrofluid concentration, but for the system under test the better results were observed in an intermediate flow rate range of from about 2-3 gpm.

We claim:

1. A method of managing equipment temperature comprising:
   preparing a ferrofluid;
   combining the ferrofluid with a water-based working fluid to produce an enhanced working fluid containing a mixture of the ferrofluid and the working fluid, wherein a heat capacity of the enhanced working fluid is greater than a heat capacity of the working fluid;
   circulating the enhanced working fluid containing the mixture through the equipment; and
   controlling heat transfer between the equipment and the enhanced working fluid in response to a sensed parameter relating to temperature by adjusting one or more of:
   (i) an enhanced working fluid flow rate through the equipment, and
   (ii) a concentration of ferrofluid in the circulating enhanced working fluid.

2. The method of managing equipment temperature according to claim 1, further comprising;
   monitoring the concentration of the ferrofluid within the circulating enhanced working fluid.

3. The method of managing equipment temperature according to claim 2, wherein the heat transfer between the equipment and the enhanced working fluid is controlled by adjusting the concentration of the ferrofluid within the circulating enhanced working fluid.

4. The method of managing equipment temperature according to claim 3, further comprising:
   manufacturing additional ferrofluid as needed for addition to the enhanced working fluid.

5. The method of managing equipment temperature according to claim 1, wherein:
   the equipment comprises a die.

6. The method of managing equipment temperature according to claim 5, comprising:
   adjusting a temperature of the enhanced working fluid containing the mixture to within a target temperature range before circulating the enhanced working fluid through the die;
   introducing the enhanced working fluid into a continuous flow channel provided through the die, whereby the temperature of the die is modified by heat transfer between the die and the enhanced working fluid; and
   removing the enhanced working fluid from the flow channel provided through the die.

7. The method of managing equipment temperature according to claim 6, wherein:
   the temperature of the enhanced working fluid containing the mixture is adjusted using a heat exchanger; and
   the enhanced working fluid flows sequentially through the die and the heat exchanger.

8. The method of managing equipment temperature according to claim 7, wherein:
   the continuous flow channel is configured to prevent injection of the enhanced working fluid into a mold cavity defined by the die.

9. The method of managing equipment temperature according to claim 5, comprising:
   passing the enhanced working fluid having a first temperature within an inlet temperature range into the die and removing the enhanced working fluid having a second temperature from the die;
   monitoring the second temperature of the enhanced working fluid exiting the die; and
   controlling flowpaths through a plurality of heat exchangers whereby the temperature of the enhanced working fluid exiting the die can be restored to the first temperature.

10. The method of managing equipment temperature according to claim 9, wherein:
    at least a first heat exchanger is configured for heating the enhanced working fluid containing the mixture; and at least a second heat exchanger is configured for cooling the enhanced working fluid containing the mixture.

11. The method of managing equipment temperature according to claim 1, further comprising:
controlling the temperature of the enhanced working fluid.

12. The method of managing equipment temperature according to claim 11, further comprising:
adjusting the temperature of the enhanced working fluid in a heat exchanger, the heat exchanger being separated from the equipment.

13. The method of managing equipment temperature according to claim 1, wherein the circulating the enhanced working fluid containing the mixture through the equipment comprises:
contacting an internal surface of the equipment with a portion of the enhanced working fluid containing the mixture; and
removing the portion of the enhanced working fluid containing the. mixture from the internal surface of the equipment.

14. The method of managing equipment temperature according to claim 1, wherein the ferrofluid comprises a carrier fluid and iron oxide particles.

15. The method of managing equipment temperature according to claim 14, wherein the iron oxide particles have a diameter of less than 100 nm.

16. The method of managing equipment temperature according to claim 14, wherein a fluorescent dye is bound to surfaces of the iron oxide particles.

17. The method of managing equipment temperature according to claim 14, wherein a concentration of iron in the ferrofluid is from 0.001% to 1.0%.

18. The method of managing equipment temperature according to claim 1, wherein the concentration of ferrofluid in the enhanced working fluid is from 44 mg/L to 1142 mg/L.

19. The method of managing equipment temperature according to claim 2, wherein the enhanced working fluid flow rate through the equipment is from 2 to 9 gallons per minute.

20. The method of managing equipment temperature according to claim 1, wherein the heat capacity of the enhanced working fluid is from about 20% to about 40% greater than the heat capacity of the working fluid.

21. The method of managing equipment temperature according to claim 1, wherein the ferrofluid is combined with the working fluid by pumping respective streams of the ferrofluid and the working fluid so that the streams are mixed into a combined stream constituting the enhanced working fluid.

22. A method of managing equipment temperature comprising: pumping respective streams of a ferrofluid and a water-based working fluid and combining the streams to provide an enhanced working fluid stream; circulating the enhanced working fluid stream through the equipment; and controlling heat transfer between the equipment and the enhanced working fluid stream in response to a sensed parameter relating to temperature by adjusting one or more of: (i) a fluid flow rate of the enhanced working fluid stream through the equipment, and (ii) a concentration of ferrofluid in the enhanced working fluid stream.

23. The method of managing equipment temperature according to claim 22, wherein the working fluid includes water.

24. The method of managing equipment temperature according to claim 22, wherein the respective streams of the ferrofluid and the working fluid are pumped with a pump.

* * * * *